(No Model.) 2 Sheets—Sheet 2.

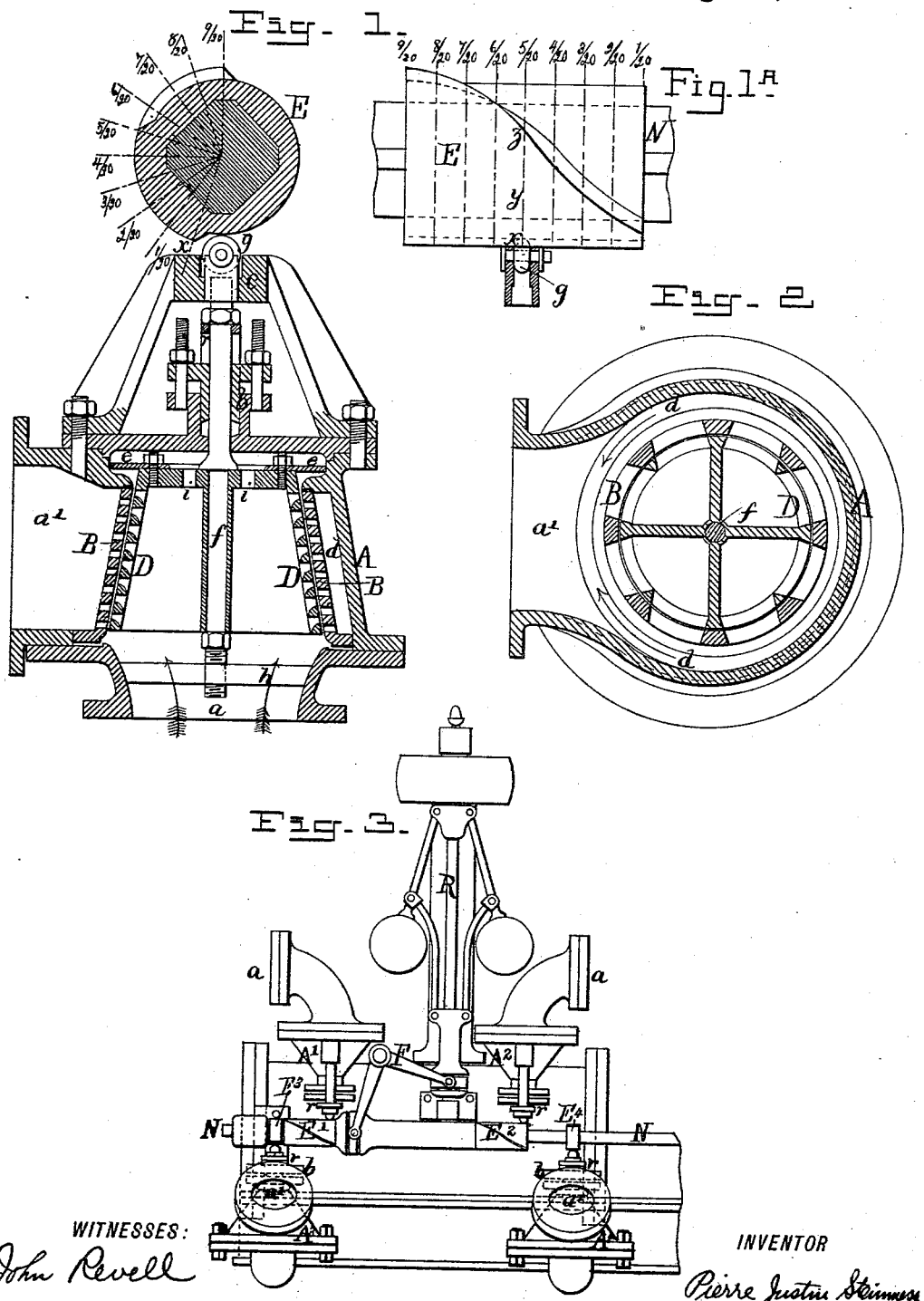

P. J. STEINMESSE.
VALVE AND VALVE MECHANISM.

No. 457,594. Patented Aug. 11, 1891.

WITNESSES:
John Revell
S. C. Connor

INVENTOR
Pierre Justin Steinmesse
BY Howson and Howson
his ATTORNEYS

UNITED STATES PATENT OFFICE.

PIERRE JUSTIN STEINMESSE, OF BOIS-COLOMBES, FRANCE.

VALVE AND VALVE MECHANISM.

SPECIFICATION forming part of Letters Patent No. 457,594, dated August 11, 1891.

Application filed October 9, 1890. Serial No. 367,606. (No model.) Patented in France March 26, 1890, No. 204,590, and in England August 24, 1890, No. 13,487.

*To all whom it may concern:*

Be it known that I, PIERRE JUSTIN STEINMESSE, a citizen of the Republic of France, residing in Bois-Colombes, Seine, France, have invented Improvements in Valves and Valve Mechanism for the Distribution of Steam in Steam-Engines and for other Like Purposes, (for which I have obtained patents in England August 24, 1890, No. 13,487, and in France March 26, 1890, No. 204,590,) of which the following is a specification.

This invention relates to an improved distribution system for steam-engines with four distribution-valves, the object being to provide a system of distribution of the greatest simplicity both in its construction and operation. Wire-drawing of the steam is obviated by causing the admission and exhaust ports or orifices to be instantly set full open at the proper time, and the period of admission is controlled by the governor of the engine. The steam-distribution valves are constructed according to this invention in the form of taper or conical hollow valves, presenting annular perforations or slots fitting into seats of corresponding form, so that a slight movement of the valve in the direction of its axis is sufficient to open the passage to the utmost extent, as hereinafter explained.

In order that my said invention may be fully understood, I shall now proceed more particularly to describe the same, and for that purpose shall refer to the several figures on the annexed sheet of drawings, the same letters of reference indicating corresponding parts in all the figures.

Figure 4:
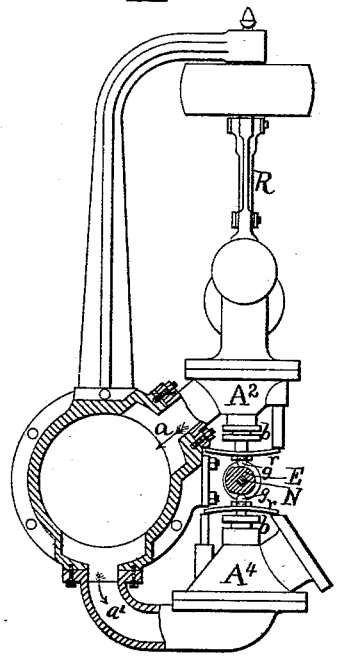
Figure 5:
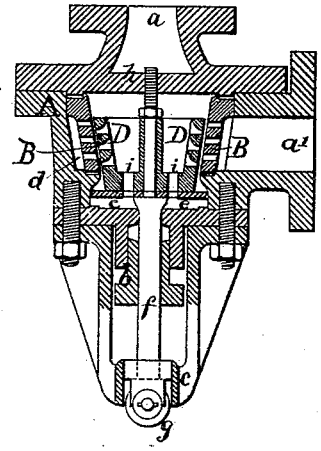
Figure 6:
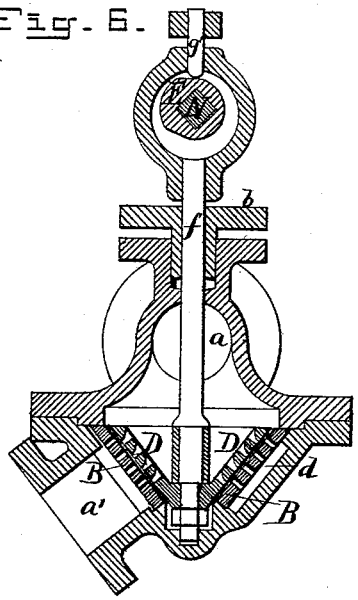
Figure 7:
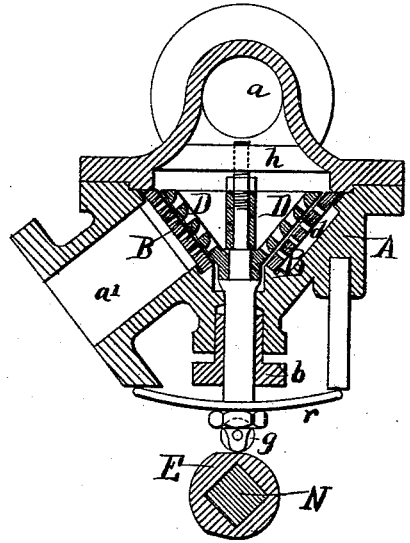

Figure 1 of the accompanying drawings represents in vertical section a valve according to this invention. Fig. 1ᵃ is a side view of the operating-cam shown in Fig. 1. Fig. 2 represents the valve in horizontal section. Figs. 3 and 4 illustrate in longitudinal elevation and in transverse section, respectively, the application of the valves to an engine with four distribution-valves. Figs. 5, 6, and 7 are views of modifications.

These valves are composed of two main parts, namely: first, a box or case A, provided with two tubular unions or junction-pieces $a\,a'$, a gland $b$, a bridge-piece or guide $c$, a taper or conical seat D, with perforations or slots surrounded by a passage $d$, formed by widening of the tube $a'$ or connection with the cylinder, and in which the steam circulates before entering the latter; second, a taper or conical valve D, with perforations working in the aforesaid seat B and provided with a disk $e$ and a rod $f$, having a roller $g$ at its extremity. The valve-rod is guided at the lower extremity by a transverse bar $h$ and at the upper part by the gland $b$. The plate closing one end of the valve is perforated with holes $i$, and a spring $r$ is provided, which tends to press the valve to its seat. These two parts—namely, the valve and its seat—are each formed by an equal number of rings of the same thickness, separated by narrow spaces or openings, so as to form a species of grating. These rings are connected together by bars arranged at suitable intervals, so as to strengthen the rings and maintain them at the proper distances apart, and in the case of the valve the rings are connected to a central boss, through which the valve-rod $f$ is passed. The valve D is displaced in the direction of its axis by means of a cam E or other suitable mechanical device acting on the valve-rod. According to the arrangement illustrated, a cam E of cylindrical form is employed, the eccentricity or difference in the radii $m$ and $n$ being equal to the width or thickness of one ring in the valve-seat B, or, in other words, is equal to the stroke or displacement necessary to enable the valve E to uncover the orifices or slots in the seat B. The said arm acts by rotating in contact with the roller $g$, and its projection $x\,y\,z$ maintains the valve raised or open during a period regulated by its development. The same cam may be formed with different profiles or length of the projecting part, advancing by degrees from, say, one-twentieth to nine-twentieths of the circumference, and thus enabling the period of opening of the valve to be regulated by simply displacing the cam in the direction of its axis of rotation.

In place of the cylindrical cam E with a projection, a grooved or disk cam may be employed, having a positive connection with the valve-rod $f$, and consequently enabling the spring $r$, which is employed to keep the roller $g$ in contact with the cylindrical cam, to be dispensed with.

Figs. 3 and 4 illustrate a steam-engine cylinder constructed with four valve chests or boxes A' A² A³ A⁴, which, with slight modification in the shape, are the same as that illustrated in Fig. 1. The two upper chests admit steam and the two lower chests are for the exhaust. The former are inverted relatively to the latter, but their construction is the same.

The steam-supply valves are worked by cams E and E², united by a sleeve M, connected by a bell-crank lever F or by any other suitable connection with the governor R, a feather and keyway enabling the sleeve and cams to slide longitudinally on the shaft N while partaking of the rotary motion communicated to the latter from the engine-shaft. The exhaust-valves are worked by cams E³ E⁴, immovably fixed on the valve-shaft N.

The acting surface $x\ y\ z$ of the admission-valve cams E' E² are graduated or have a varying development; but the exhaust-valve cams are provided with uniform-acting surfaces or projections $x\ y\ z$, extending over, say, one-half of the circumference. It results from this arrangement that the cams E' and E² being adjustable for a given normal speed, any diminution or increase of speed has the effect of causing the governor to displace the cams upon the valve-motion shaft and causing them to present a different profile $x\ y\ z$ to the valve-rods of the steam-supply valves, and the length of the period during which the steam-supply ports or orifices are opened is regulated accordingly. In all cases the valves are instantaneous in their action, and the steam passes through the full or entire area of the parts without wire-drawing or contraction of the current. The same results are obtained with the exhaust-valves.

Engines provided with distribution-valves and valve mechanism according to this invention possess the advantage of being absolutely reversible, this not being the case in other engines, such as Corliss engines, for example.

In order to balance the pressure and enable the valves to work with a minimum of resistance, the steam under boiler-pressure is allowed to pass through the holes $i$, hereinbefore referred to, in the end of the valve, and acts on one side of the disk $e$, connected to the valve, which disk is acted on in like manner on the other side by the steam when the valve is open. The edges of the disk $e$ may be packed and work steam-tight in a cylindrical chamber. The arrangement of the apparatus is such as to require no lubrication, and this constitutes an additional advantage.

Figs. 5, 6, and 7 illustrate modifications, which, in fact, differ merely in the forms and dimensions of the valve-case E. The principles of construction and action being the same as hereinbefore described, and the same letters of reference being employed to indicate corresponding parts, these figures will be understood without further explanation.

The improved valves, according to this invention, may be constructed of any suitable shape or dimensions and may be employed in any suitable manner, in combination either with steam-engines or with other apparatus in which it is required to obtain an instantaneous and regulated admission or passage of steam or other fluid. The rotary motion and the longitudinal or axial displacement of the cam E may be obtained mechanically or automatically, or by hand or by any other suitable means.

I claim as my invention in the system of distribution for steam-engines with four valves or distributers hereinbefore described—

1. A distribution-valve for steam-engines, consisting of a conical valve-box, a conical perforated valve, and a valve-stem, in combination with a cam to axially act on the valve-stem to instantaneously seat and unseat the valve, all substantially as and for the purpose set forth.

2. A distribution-valve for steam-engines, consisting of a valve-box, a valve and seat in the form of a truncated cone and having slots, and means for reciprocating the valve-stem, in combination with the openings in the valve and seat and the disk $e$, substantially as and for the purpose set forth.

3. A distribution-valve for steam-engines, consisting of a valve-box, a slotted valve and valve-seat, a valve-stem provided with a roller at its outer end, and a spring or its equivalent to normally hold the valve closed, in combination with a cam to act on the roller to reciprocate the valve-stem, substantially as set forth.

In testimony whereof I have signed my name to this specification in the presence of two subscribing witnesses.

PIERRE JUSTIN STEINMESSE.

Witnesses:
LÉON FRANCKENS,
ROBT. M. HOOPER.